United States Patent [19]

Yokota et al.

[11] Patent Number: 4,641,212
[45] Date of Patent: Feb. 3, 1987

[54] APPARATUS FOR LOADING A MAGNETIC DISC AND FOR CONTROLLING THE DRIVING THEREOF

[75] Inventors: Yuji Yokota; Akira Osabe, both of Chichibu, Japan

[73] Assignee: Canon Denshi Kabushiki Kaisha, Saitama, Japan

[21] Appl. No.: 536,255

[22] Filed: Sep. 27, 1983

[30] Foreign Application Priority Data

Oct. 1, 1982 [JP] Japan ................... 57-171053

[51] Int. Cl.$^4$ ............................................. G11B 17/04
[52] U.S. Cl. ........................................ 360/99; 360/97; 360/105; 360/106
[58] Field of Search ................... 360/99, 97, 105, 106, 360/133, 96.5, 86, 137, 96.6

[56] References Cited

U.S. PATENT DOCUMENTS

| 4,096,537 | 6/1978 | Butsch | 360/106 |
|---|---|---|---|
| 4,466,031 | 8/1984 | Muraoka | 360/97 |
| 4,539,613 | 9/1985 | Suyama et al. | 360/99 |
| 4,546,396 | 10/1985 | Schatteman | 360/97 |

FOREIGN PATENT DOCUMENTS

| 2809060 | 9/1979 | Fed. Rep. of Germany | 360/99 |
|---|---|---|---|
| 55-52559 | 4/1980 | Japan | 360/99 |
| 58-68278 | 4/1983 | Japan | 360/137 |
| 58-169301 | 5/1983 | Japan | 360/137 |
| 58-108073 | 6/1983 | Japan | 360/99 |
| 58-108060 | 6/1983 | Japan | 360/99 |

OTHER PUBLICATIONS

Yanker, "Diskette Orientation Detector and Ejector," IBM Technical Disclosure Bulletin, vol. 23, No. 7A, Dec. 1980, pp. 2640-2641.
Townsend, "Ejection Feature Improvement for a Floppy Disc Device," Xerox Disclosure Journal, vol. 4, No. 2, Mar./Apr. 1979, pp. 275-276.

*Primary Examiner*—John H. Wolff
*Assistant Examiner*—Matthew J. Bussan
*Attorney, Agent, or Firm*—Spencer & Frank

[57] ABSTRACT

A hub holder which pushes the center hub of a magnetic disc to a reference surface for setting is associated with a cassette guide for guiding a magnetic disc cassette to a recording/reproducing position at which information is recorded or reproduced to or from the magnetic disc, so that the hub holder's displacement can be amplified by a required degree. An upper dust-proof door and a lower dust-proof door are swingably disposed at the cassette insertion opening of a magnetic disc unit, and they are normally so biased that they close the cassette insertion opening dust-tightly. When they are closed, one of them abuts against the other. Thus, the magnetic disc unit is compact in size and light in weight, easily clamps the center hub of the magnetic disc, and is closed in a completely dust tight manner.

10 Claims, 24 Drawing Figures

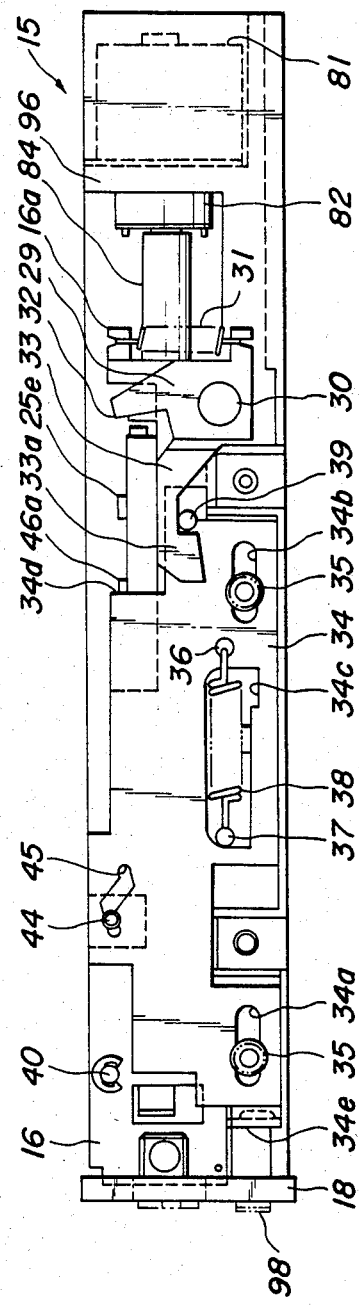
FIG_5

FIG_19A
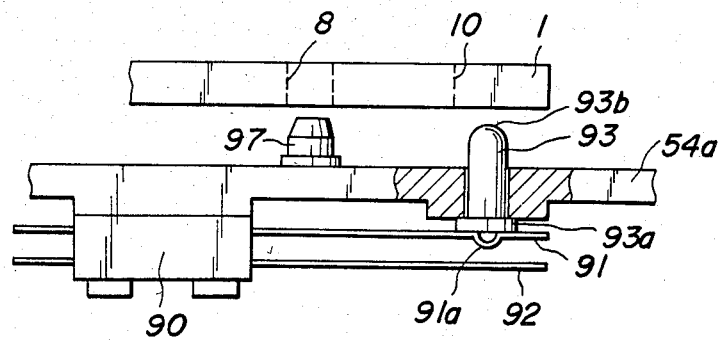
FIG_19B
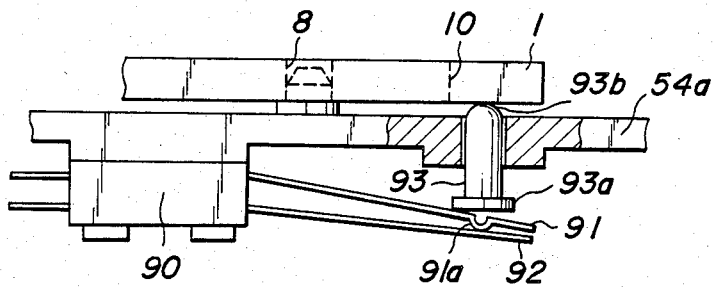
FIG_20A
PRIOR ART
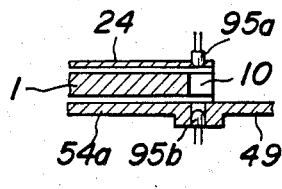
FIG_20B
PRIOR ART
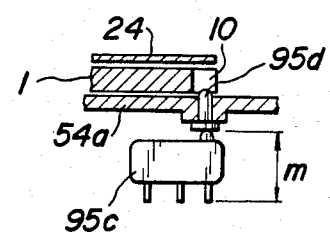

APPARATUS FOR LOADING A MAGNETIC DISC AND FOR CONTROLLING THE DRIVING THEREOF

BACKGROUND OF THE INVENTION

1. Field of the Invention

The present invention relates to a magnetic disc unit and more particularly to a magnetic disc unit of the type using a magnetic disc cassette of which a hard casing contains a magnetic disc as magnetic recording medium having a center hub.

2. Description of the Prior Art

There have been known a magnetic disc cassette of the type in which a magnetic disc with a center hub is contained in a hard casing. A conventional magnetic disc unit which loads the magnetic disc cassette of the type described for recording or reproducing information therein or therefrom has the following various disadvantages.

In the conventional magnetic disc unit, after the magnetic disc cassette has been inserted into the magnetic disc unit, the magnetic disc is clamped by an additional operation of closing a door, rotating a lever or pushing a button. As a result, a large number of component parts are required, so that the magnetic disc unit is large in size and complicated in operation.

In the conventional magnetic disc unit, in order to clamp a magnetic disc, a center cone fits in a center hole of a center hub of the magnetic disc, and pushes the center hub against a spindle. As a result, one set of clamping mechanism is needed which clamps the magnetic disc. Therefore, the magnetic disc unit cannot be made compact in size or thin and its mechanism is complicated.

The conventional magnetic disc unit has one dustproof door which is swingably attached to the cassette insertion opening. Such one dust-proof door results in a long radius of rotation when the door swings, so that a large space must be provided in order to allow the dust-proof door to swing, contrary to a recent tendency of making the magnetic disc unit more compact in size.

In order to solve this problem, there has been proposed a set of an upper dust-proof door and a lower dust-proof door, but unless the mating edges of the upper and lower dust-proof doors are spaced apart from each other by a small gap, they cannot be opened or closed, so that dust particles enter the inside of the magnetic disc unit through the gap between them.

In the conventional magnetic disc unit, photoswitches or microswitches are used to detect whether or not a magnetic disc cassette has properly been loaded at a suitable position. If the photoswitches are used, a light source and a photo detector must be disposed in opposite to each other, for example, in a vertical direction for the purpose of photo coupling, so that the magnetic disc unit become high and cannot be made compact in size. The same is true for microswitches.

SUMMARY OF THE INVENTION

It is, therefore one of the objects of the present invention to provide a magnetic disc unit which is compact in size and simple in construction.

It is also an object of the present invention to provide a magnetic disc unit which facilitates and ensures the clamp of a magnetic disc.

It is a further object of the present invention to provide a magnetic disc unit which can be closed in a dust tight manner.

In order to attain these objects, a magnetic disc unit having a magnetic head for recording or reproducing information on or from a magnetic disc having a center hub and being accommodated in a cassette according to one aspect of the present invention comprises a cassette guide member for carrying the cassette in a manner that the cassette guide member moves the cassette to a predetermined position in the insertion direction of the cassette in accordance with the insertion of the cassette and for guiding the cassette to a recording/reproducing position at which information is recorded or reproduced on or from the magnetic disc; a spindle for rotating the magnetic disc; a hub holding member for pushing the center hub of the magnetic disc to the spindle to hold the magnetic disc between the spindle and the hub holding member; a transmitting member having a first portion for moving the cassette guide member to the recording/reproducing position, and a second portion for moving the hub holding member to the spindle in such a way that the displacement of the second portion is larger than that of the first portion; and a driving member for driving the transmitting member to move the transmitting member in a manner that the cassette guide member is positioned to the recording/reproducing position, when the cassette guide member reaches the predetermined position.

In a preferred embodiment of the invention, the transmitting member may be a rotary plate having an end pivotally supported to be rotated by the driving member. The distance between the second portion and the end may be longer than the distance between the first portion and the end, so that the movement of the second portion is amplified in accordance with the ratio between the distances.

The driving member may have an eject lever, a spring member for moving the eject lever in the direction of the ejection when the cassette guide member reaches the predetermined position and a button for controlling the discharge of the cassette. The eject lever can be moved in the direction of the ejection of the cassette by the spring member, when the cassette guide member reaches the predetermined position in a manner that the rotary plate swings toward the recording/reproducing position and can be moved in the direction of the insertion of the cassette by the button in a manner such that the rotary plate swing from the recording/reproducing position.

Preferably, the magnetic disc unit may further comprise a cassette discharge lever for discharging the cassette. The cassette discharge lever moves in the insertion direction of the cassette in accordance with the insertion of the cassette and is kept in the lock condition in which the cassette discharge lever does not discharge the cassette. When the cassette reaches the predetermined position, the lock condition is released by the eject lever to discharge the cassette when the eject lever is moved in the insertion direction of the cassette in response to the operation of the button.

In another preferred embodiment of the invention, the spindle may have a spindle shaft which is movable in a direction perpendicular to the main surface of the cassette and is biased toward such a direction as to push the center hub in a manner that the center hub is clamped between the hub holding member and the spindle shaft.

The magnetic disc unit may further comprise a head seeking mechanism including a stepping motor, a lead screw and a gimbal spring for connecting the stepping motor to the lead screw in such a way that the magnetic head toward a position on the magnetic disc at which the information is recorded or reproduced.

In a second aspect of the present invention, a magnetic disc unit having a magnetic head for recording or reproducing information on or from a magnetic disc having a center hub and being accommodated in a cassette comprises a cassette guide member for carrying the cassette in a manner that the cassette guide member moves the cassette to a predetermined position in the insertion direction of the cassette in accordance with the insertion of the cassette and for guiding the cassette to a recording/reproducing position at which information is recorded or reproduced on or from the magnetic disc; a spindle for rotating the magnetic disc; a hub holding member for pushing the center hub of the magnetic disc to the spindle to hold the magnetic disc between the spindle and the hub holding member; a transmitting member having a first portion for moving the cassette guide member to the recording/reproducing position, and a second portion for moving the hub holding member to the spindle in such a way that the displacement of the second portion is larger than that of the first portion; a driving member for driving the transmitting member to move the transmitting member in a manner that the cassette guide member is positioned to the recording/reproducing position, when the cassette guide member reaches the predetermined position; an opening for allowing the insertion of the cassette; and a pair of dust-proof doors, each of which is pivotally supported inside of the opening in a manner that the dust-proof doors are so biased that an end of one of the dust-proof doors which is not pivotally supported is in contact with the side of the other dust-proof door to close the opening when the cassette is not inserted.

In a third aspect of the present invention, a magnetic disc unit, which has a magnetic head for recording or reproducing information on or from a magnetic disc having a center hub and being accommodated in a cassette having a notch notched at one end of said cassette from the side of one main surface of the cassette to the side of another main surface of the cassette for detecting the insertion and one main surface of the cassette, comprises a cassette guide member for carrying the cassette in a manner that the cassette guide member moves the cassette to a predetermined position in the insertion direction of the cassette in accordance with the insertion of the cassette and for guiding the cassette to a recording/reproducing position at which information is recorded or reproduced on or from the magnetic disc; a spindle for rotating the magnetic disc; a hub holding member for pushing the center hub of the magnetic disc to the spindle to hold the magnetic disc between the spindle and the hub holding member; a transmitting member having a first portion for moving the cassette guide member to the recording/reproducing position, and a second portion for moving the hub holding member to the spindle in such a way that the displacement of the second portion is larger than that of the first portion; a driving member for driving the transmitting member to move the transmitting member in a manner that the cassette guide member is positioned to the recording/reproducing position, when the cassette guide member reaches the predetermined position; a pair of leaf switches disposed at positions corresponding to the notch when the cassette is inserted with the one main surface upside and down side, respectively; a first means for detecting the insertion of the cassette in response to the combination of the operations of the pair of leaf switches when the cassette held in the cassette guide member reaches the recording/reproducing position; and a second means for detecting that the one main surface is positioned upside in response to the combination of the operation of the pair of leaf switches when the cassette held in the cassette guide member reaches the recording/reproducing position.

In a fourth aspect of the present invention, a magnetic disc unit for recording or reproducing information on or from a magnetic disc having a center hub and being accommodated in a cassette comprises, a cassette guide member for carrying the cassette in a manner that the cassette guide member moves the cassette to a predetermined position in the insertion direction of the cassette in accordance with the insertion of the cassette and for guiding the cassette to a recording/reproducing position at which information is recorded or reproduced on or from the magnetic disc; a spindle for rotating the magnetic disc; a hub holding member for pushing the center hub of the magnetic disc to the spindle to hold the magnetic disc between the spindle and the hub holding member; a transmitting member having a first portion for moving the cassette guide member to the recording/reproducing position, and a second portion for moving the hub holding member to the spindle in such a way that the displacement of the second portion is larger than that of the first portion; a driving member for driving the transmitting member to move the transmitting member in a manner that the cassette guide member is positioned to the recording/reproducing position, when the cassette guide member reaches the predetermined position; a magnetic head contacting the magnetic disc to record or reproduce information on or from the magnetic disc when the cassette is positioned at the recording/reproducing position; a first arm member having a first end and a second end which are pivotal at a fulcrum formed on the cassette guide member; a stopper member for stopping the first end of the first arm member at a stopping position; and a second arm member for supporting the magnetic head and for moving the magnetic head toward the magnetic disc in a manner that the magnetic head contacts the magnetic disc in accordance with the movement of the second end of the first arm member when the cassette guide member reaches the recording/reproducing position.

Here, it is preferable that the fulcrum is determined at a position between the first end and the second end of the first arm member. The first arm member swings around the first end stopped by the stopper member in accordance with the movement of the fulcrum and the second end moves toward the magnetic head when the cassette guide member reaches the recording/reproducing position. When the magnetic disc is recorded or reproduced information, the stopper member releases the first end of the first arm member from the stopping position to rotate the first arm member rotates a round the fulcrum and to move the second end of the first arm member toward the magnetic disc at the time of recording/reproducing information on/from the magnetic disc, in a manner that the displacement of the second end of the first arm member is larger than that of the fulcrum.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 5 is a side view of the magnetic disc unit shown in FIG. 2;

FIG. 19A is a side view showing the OFF condition of the cassette detection mechanism shown in FIG. 18;

FIG. 19B is a side view showing the ON condition of the cassette detection mechanism shown in FIG. 18; and FIGS. 20A and 20B are side views showing two examples of conventional cassette detection mechanisms.

DETAILED DESCRIPTION OF THE PREFERRED EMBODIMENTS

Figure 1:
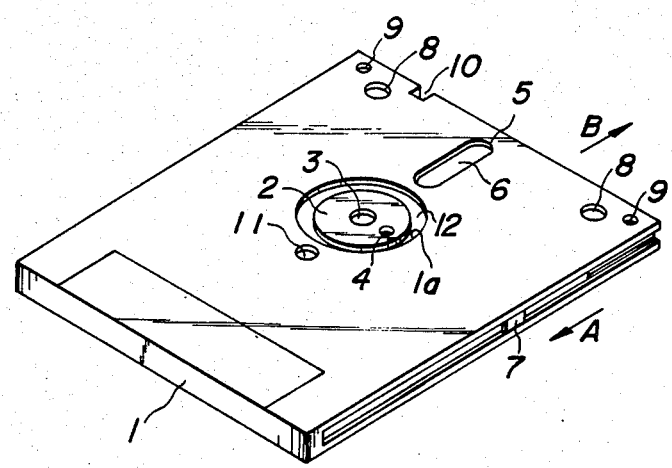
FIG. 1 is a perspective view showing a conventional magnetic disc cassette.
Figure 3:
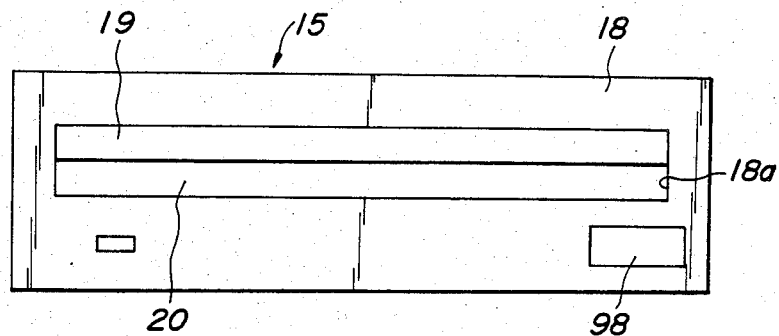
FIG. 3 is a front view of the magnetic disc unit shown in FIG. 2.

FIG. 1 shows a magnetic disc cassette to be used in a magnetic disc unit in accordance with the present invention. The cassette 1 contains a magnetic disc 12. A center hub 2 for clamping protrudes at the center of the magnetic disc 12 and has a center hole 3 disposed at the center of the hub 2 for centering. A driving hole 4 into which a pin for rotating the magnetic disc 12 is inserted is formed in the vicinity of the center hole 3.

The cassette 1 is inserted into a magnetic disc unit in the direction indicated by the arrow B. A head window 5 is formed on the front side of the cassette 1. A dust-proof or dust-tight shutter 6 is slidably provided inside of the head window 5.

On both sides of the head window 5 are formed are small holes 8 for positioning the cassette 1 and write-protecting holes 9. A notch 10 is formed so as to detect the top or back surface of the cassette 1.

The cassette 1 is further provided with an index hole 11 and a slide lever 7 for opening or closing the shutter 6. When the cassette 1 is inserted into the magnetic disc unit, the slide lever 7 engages with a pawl (not shown) disposed in the magnetic disc unit, so that the lever 7 slides toward a direction indicated by the arrow A whereby the shutter 6 is opened.

The magnetic disc cassette 1 with the above-described construction can be inserted into a magnetic disc unit in accordance with the present invention as shown in FIG. 2 through FIG. 8.

The magnetic disc unit generally designated by the reference numeral 15 has a couple of side panels 16 and 17 and a front panel 18 extended between the side panels 16 and 17. The front panel 18 is formed with a cassette insertion opening 18a through which the cassette 1 is inserted.

Figure 9:
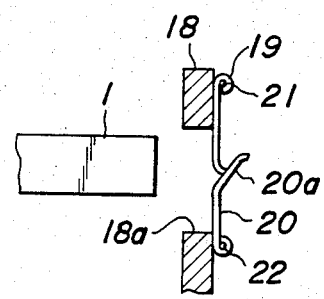
FIGS. 9 and 10 are side views showing an embodiment of dust-proof doors in a magnetic disc unit in accordance with the present invention.
Figure 10:
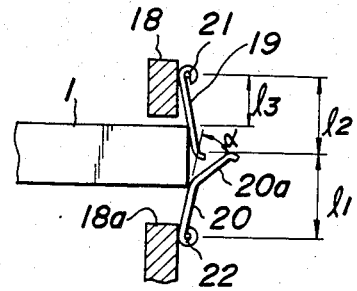

As shown in FIGS. 2, 6A, 6B, 9 and 10 and particularly as best shown, on enlarged scale, in FIGS. 9 and 10, upper and lower dust-proof doors 19 and 20 are pivotally supported by shafts 21 and 22, respectively, which in turn are mounted to the inner surface of the front panel 18. The upper and lower dust-proof doors 19 and 20 are normally biased under the forces of coiled springs 23 (See FIG. 2) mounted to the shafts 21 and 22 in a manner that the upper and lower dust-proof doors 19 and 20 normally close the cassette insertion opening 18a.

Figure 11A:
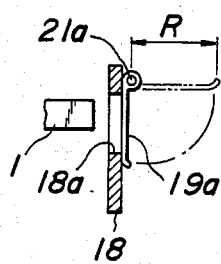
FIGS. 11A and 11B are side views showing two examples of conventional dust-proof doors.
Figure 11B:
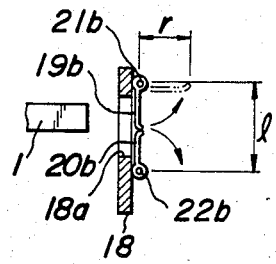

If only one dust-proof door 19a is provided as shown in FIG. 11A, the space with a depth R corresponding to the width of the dust-proof door 19a must be provided so as to permit the rotation of the dust-proof door 19a around its shaft 21a. On the other hand, in order to reduce the space, the upper and lower dust-proof doors 19b and 20b may be provided as shown in FIG. 11B. In this case, the space with a depth r (where $r \simeq R/2$) must be provided so as to allow the rotation of the upper and lower dust-proof doors 19b and 20b around the shafts 21b and 22b. Therefore, the required depth becomes shorter and accordingly the magnetic disc unit can be made more compact in size. However, if the distance l between the upper and lower shafts 21b and 22b is not equal to the sum of the the heights of the upper and lower dust-proof doors 19b and 20b, it may happen that the leading edges of the dust-proof doors 19b and 20b collide with each other or are spaced apart from each other, so that the dust-proof doors 19b and 20b do not function to prevent dust from invading through the opening 18a. This inconvenience is caused often by dimensional variations of parts, that is, the upper and lower dust-proof doors 19b and 20b.

Referring back to FIGS. 9 and 10, the lower edge of the upper dust-proof door 19 abuts against the front surface of the lower dust-proof door 20 in a manner that, as best shown in FIG. 10, the upper edge portion of the lower dust-proof door 20 is bent inwardly at an angle $\alpha$, to form a bent portion 20a, against which lower edge of the upper dust-proof door 19 abuts, so that when the cassette 1 is not inserted into the magnetic disc unit 15, the cassette insertion opening 18a is tightly closed in a dust-proof manner.

In order that the lower edge of the upper dust-proof door 19 may securely abut against the bent portion 20a of the lower dust-proof door 20, it is preferable that the radii of rotation $l_1$ and $l_2$ of the lower and upper dust-proof doors 20 and 19 are substantially equal to each other.

A flat inverted-U shaped cassette guide 24 is disposed on the rear side of the front panel 18 in the magnetic disc unit 15 in such a way that the front end of the cassette guide 24 is opposite to the cassette insertion opening 18a of the front panel 18. When the cassette 1 is inserted into the cassette insertion opening 18a, the cassette 1 is first engaged with the end of the cassette guide 24 and then is guided straight by the cassette guide 24 to be inserted into the magnetic disc unit 15. In this case, a pawl or projection (not shown) engages with the slide lever 7 of the cassette 1 (FIG. 1). Accordingly, as the cassette 1 is inserted deeper, the shutter 6 is opened gradually and when the leading end of the cassette 1 reaches the bottom of the cassette guide 24, the shutter 6 is fully opened, so that heads 79 and 80 can engage with the magnetic disc 12.

Figure 2:
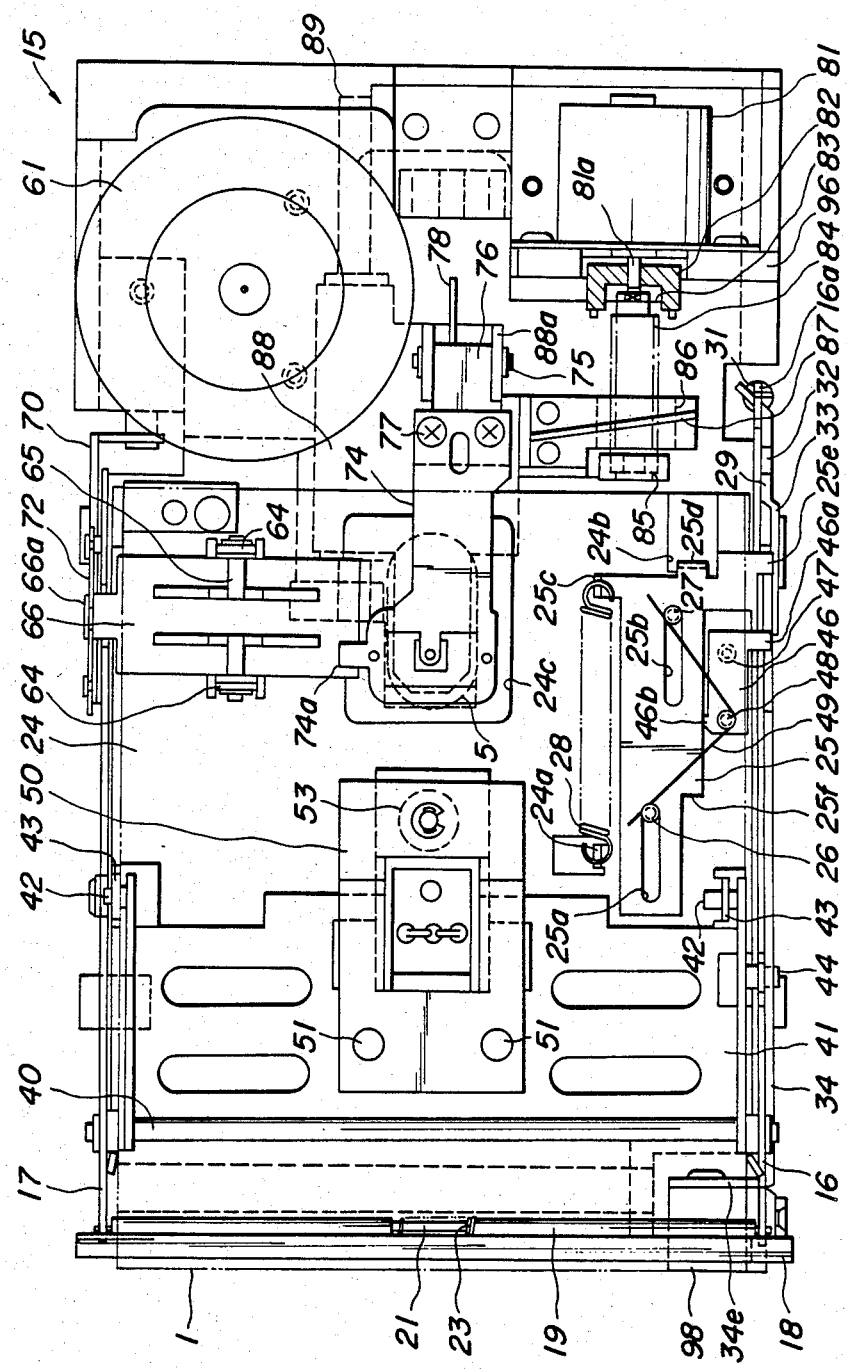
FIG. 2 is a top view showing an embodiment of a magnetic disc unit in accordance with the present invention.

As shown in FIG. 2, a cassette discharge lever 25 is disposed above the cassette guide 24. The lever 25 is provided with elongated slots 25a and 25b into which guide pins 26 and 27 are slidably fitted. A spring 28 is extended between a projection 24a formed by cutting and then folding a portion of the cassette guide 24 and an end protrusion 25c of the cassette discharge lever 25, so that the discharge lever 25 is normally biased toward the front panel 18.

The leading edge of the discharge lever 25 is folded downwardly to form a projection 25d which is fitted downwardly into an opening 24b formed in the cassette guide 24 so as to be adapted to engage with the cassette 1 when the cassette 1 is inserted into the cassette guide 24.

A projection 25e is extended from one end of the discharge lever 25 toward the side plate 16 and is adapted to engage with a locking arm 29 which is rotatably provided around a shaft 30 as shown in FIG. 5. In FIG. 5, a spring 31 is extended between a projection 16a extended from an end portion of the side panel 16 and the locking arm 29, so that the locking arm 29 is normally biased in the counterclockwise direction. The locking arm 29 has an upwardly extended arm 32 and a forwardly extended arm 33 as shown in FIG. 5. The arm 32 is positioned to be engaged with the projection 25e of the discharge lever 25.

An eject lever 34 is disposed outside of the side panel 16 and is provided with horizontally elongated slots 34a and 34b which are spaced apart from each other in the longitudinal direction of the eject lever 34. Pins 35 extended from the side panel 16 are slidably fitted into the elongated slots 34a and 34b.

An elongated opening 34c is formed substantially at the center of the ejected lever 34 between the elongated slots 34a and 34b. A hole 36 is formed in the vicinity of the elongated opening 34c on the side of the locking arm 29. The side panel 16 is provided with a hole 37 at a remote position from the hole 36, so that a spring 38 is extended between these holes 36 and 37 in such a way that the eject lever 34 is normally biased toward the front panel 18.

A pin 39 is protruded from the outer surface of an end portion of the eject lever 34 on the side of the locking arm 29. The pin 39 is engaged with a hook 33a formed at the leading edge of the forwardly extended arm 33 of the locking arm 29.

Figure 8:
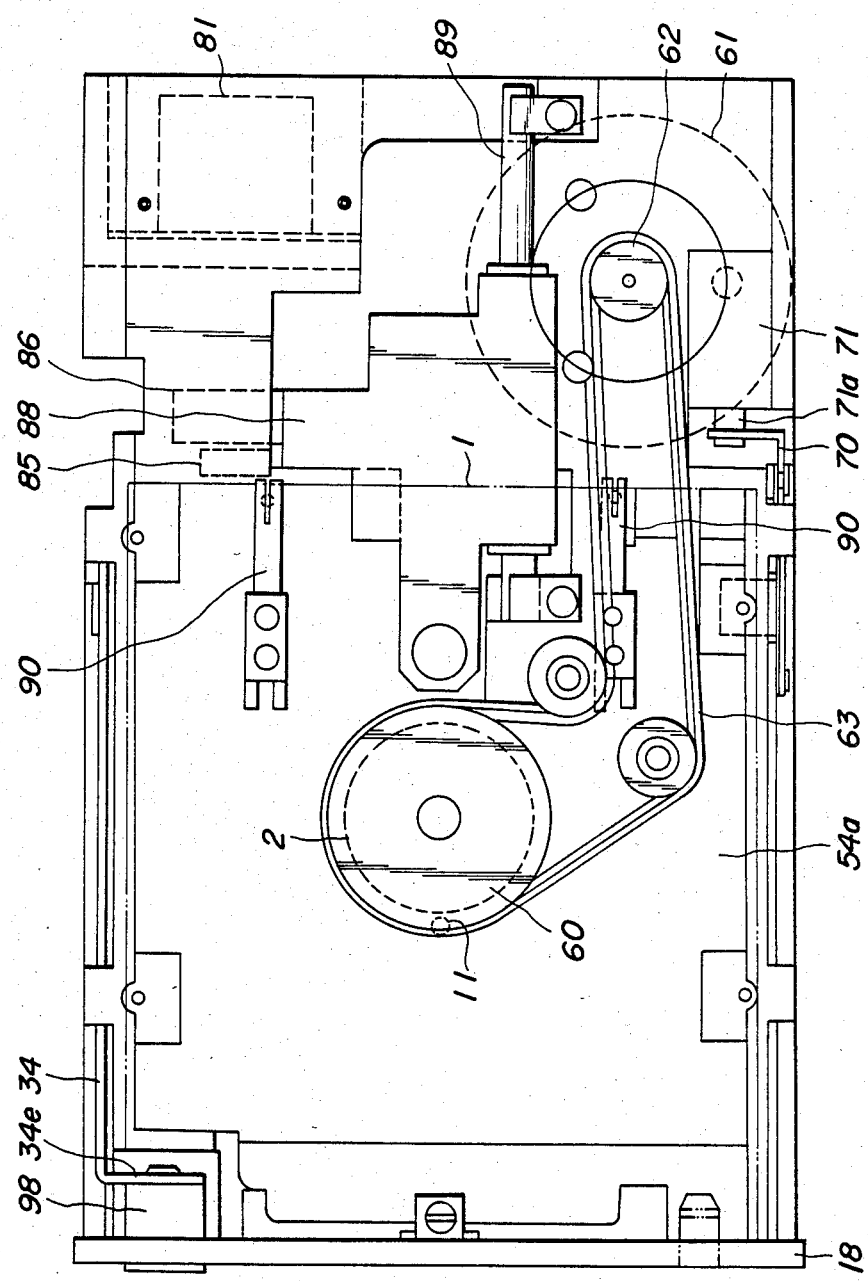
FIG. 8 is a bottom view of the magnetic disc unit shown in FIG. 2.

A button 98 for controlling the discharge of the cassette 1 is attached to the leading end of the bent portion 34e extended from the eject lever 34 toward the front panel 18, as shown in FIGS. 2 and 8.

A shaft 40 is extended between the side panels 16 and 17 as shown in FIG. 2 in parallel with and inside the front panel 18. The shaft 40 rotatably supports one end of a rotary plate 41.

A pin 42 is extended inwardly from the free end of the rotary plate 41 and is rotatably supported by a projection 43 extended from both sides of the cassette guide 24 so that the rotary plate 41 is co-operatively coupled to the cassette guide 24.

A pin 44 is protruded from the rotary plate 41 toward the side panel 16 and is slidably fitted into a Z-shaped cam hole 45 formed in the upper edge portion of the eject lever 34.

Figure 14:
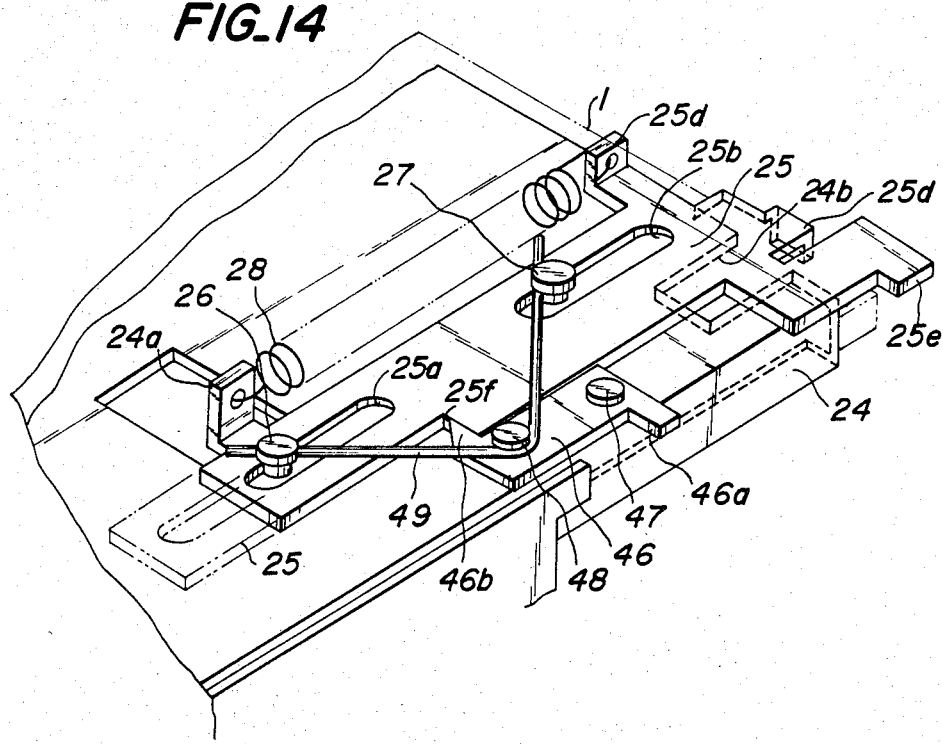
FIG. 14 is a perspective view showing a locking condition of a cassette discharge lever in accordance with the present invention.

As shown in FIG. 2 and in more detail in FIG. 14, a locking lever 46 is pivoted with a pin 47 to the cassette guide 24 in the vicinity of the cassette discharge lever 25 and on the side of the side panel 16. The locking lever 46 has a projection 46a which is extended outwardly and is positioned to be engaged with the side edge 34d of the eject lever 34 on the side of the locking arm 21.

A pin 48 is protruded from the locking lever 46 at the side edge thereof on the side opposite to the pin 47. A V-shaped spring 49 is extended between the pin 48 and the pins 26 and 27 as shown in FIGS. 2 and 14 so that the locking lever 46 is normally biased in the clockwise direction about the pin 47 in FIG. 2.

As shown in FIGS. 2 and 14, the locking lever 46 has a projection 46b which is protruded from the end portion of the locking lever 46 on the side of the pin 48 and on the side of the cassette discharge lever 25. The projection 46b is positioned to be engaged with the depending projection 25f of the cassette discharge lever 25 on the side of the front panel 18.

In FIG. 2, one end of a leaf spring 50 is securely fixed with pins 51 to the upper surface of the rotary plate 41 at the center portion thereof.

Figure 6A:
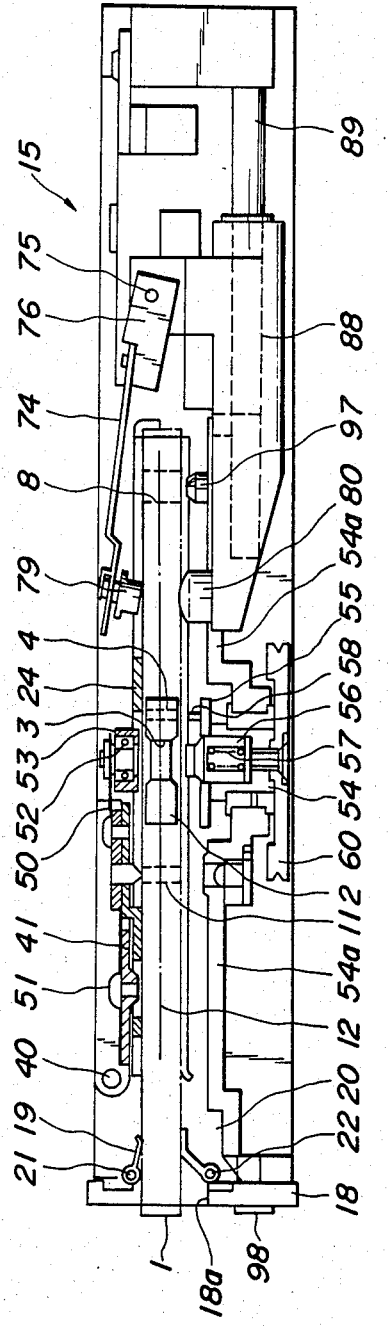
FIGS. 6A and 6B are longitudinal sectional views of the magnetic disc unit shown in FIG. 2.
Figure 6B:
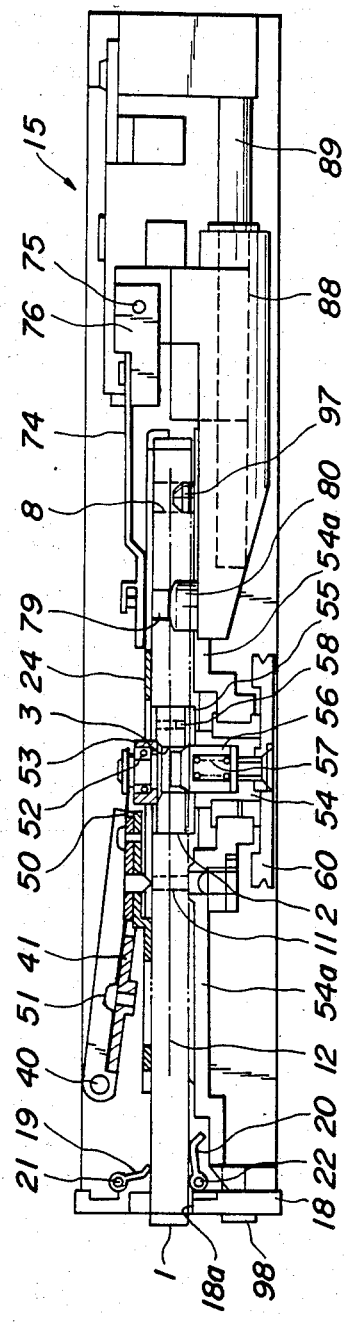

As shown in FIGS. 6A and 6B, a hub holder 53 is securely fixed through a bearing 52 to the undersurface of the leaf spring 50 on the side of its free end.

Figure 12:
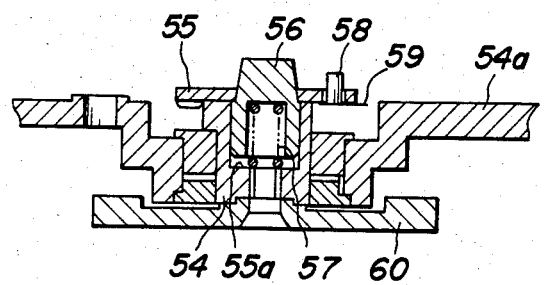
FIG. 12 is a sectional view showing, on enlarged scale, an embodiment of a spindle in a magnetic disc unit in accordance with the present invention.

In FIGS. 6A and 6B, a spindle 54 is disposed in opposed relationship with the hub holder 53. As best shown in FIG. 12, the spindle 54 is rotatably mounted to the base plate 54a of the magnetic disc unit 15. A disc 55 is fixedly attached to the upper surface of the spindle 54. At the center of the disc 55, there is formed an opening 55a through which a spindle shaft 56 is slidably fitted into the spindle 54. The spindle shaft 56 is normally biased upwardly by the force of a spring 57 which is accommodated between the inside of the spindle shaft 56 and the opening 55a. A driving pin 58 is engaged with the disc 55 in a manner that the pin 58 is vertically movable and is adapted to engage with the driving hole 4 of the hub 2 of the magnetic disc 12. The driving pin 58 is normally biased upwardly by the force of a leaf spring 59.

A pulley 60 is securely fixed to the lower end of the spindle 54. As shown in FIG. 8, an endless belt 63 is wrapped around the pulley 60 and a pulley 62 carried by the output shaft of a motor 61, so that the rotation of the motor 61 is transmitted to the pulley 60 and hence to the spindle 54.

Referring back to FIG. 2, projections 64 are protruded longitudinally of the cassette guide 24 on the upper surface thereof on the opposite side of the cassette discharge lever 25 in a manner such that the projections 64 are opposed to each other. A shaft 65 is supported between the projections 64 to rotatably carry the center portion of a head load arm 66.

Figure 7:
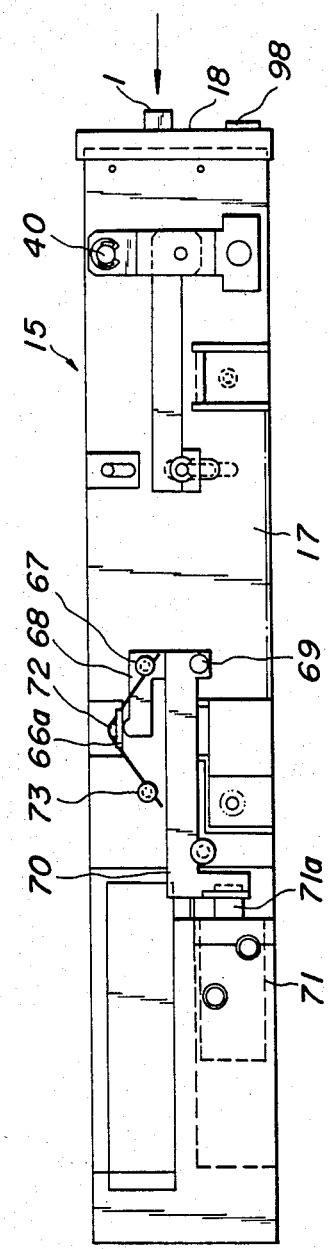
FIG. 7 is a left side view of the magnetic disc unit shown in FIG. 2.

As best shown in FIG. 7, the outer end of the head load arm 66 has a projection 66a which protrudes outwardly from the side panel 17. A push arm or lever 68 is pivotally supported by a pin 67 on the outer side of the side panel 17 below the projection 66a. The edge of the horizontal portion of the rotary arm 68 is in contact with the undersurface of the projection 66a, while the vertical portion of the rotary arm 68 is pivoted with a pin 69 to one end of a load arm or lever 70.

The other end of the load arm or lever 70 is connected to a rod 71a of a solenoid 71 fixed to a stationary member of the magnetic disc unit 15 on the side opposite to the front panel 18.

Figure 4:
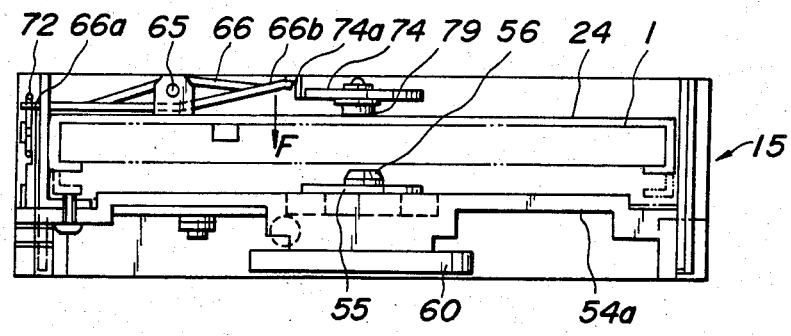
FIG. 4 is a front view of the magnetic disc unit shown in FIG. 2, with its front panel removed.

Still referring to FIG. 7, a spring 72 is extended between the projection 66a of the head load arm 66 and the pin 67 and between the pin 67 and a pin 73 which is protruded from the side panel 17, so that the head load arm 66 is normally biased in the clockwise direction in FIG. 4.

As shown in FIGS. 6A and 6B, a head arm 74 is disposed on the upper side of the cassette guide 24 in opposite relationship with the leaf spring 50. The base of the head arm 74 is securely jointed with screws 77 to a block 76 which in turn is rotatably supported through a pin 75 to a seek arm to be described below. The block 76 is normally so biased as to rotate about the pin 75 in the counterclockwise direction in FIG. 6 by the force of a coiled spring 78. A magnetic head 79 is securely attached to the lower surface of the head arm 74 at the leading edge thereof.

A positioning pin 97 is protruded from the upper surface of the base plate 54a so as to be engaged with the positioning hole 8 of the cassette 1.

The head arm 74 may be made of, for instance, a leaf spring and has a projection 74a, as shown in FIG. 2, which is protruded from the end portion of the head arm 74 on the side of the head load arm 66 toward the head load arm 66. The inner end of the head load arm 66 engages with the undersurface of the projection 74a. The head arm 74 is normally biased upwardly by the inner end of the head load arm 66 which is pushed upwardly by the force of the spring 72. The cassette guide 24 has an opening 24c which corresponds to the head 79. A stationary head 80 is disposed on a carriage to be described below in opposed relationship with the movable head 79.

Figure 15:
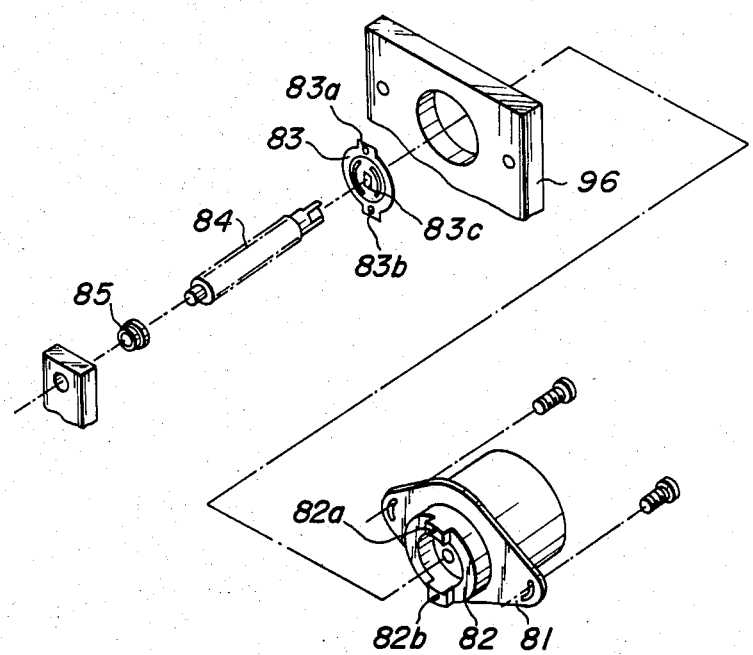
FIG. 15 is an exploded perspective view showing the interconnection between a lead screw and a stepper motor in a magnetic disc unit in accordance with the present invention.
Figure 16:
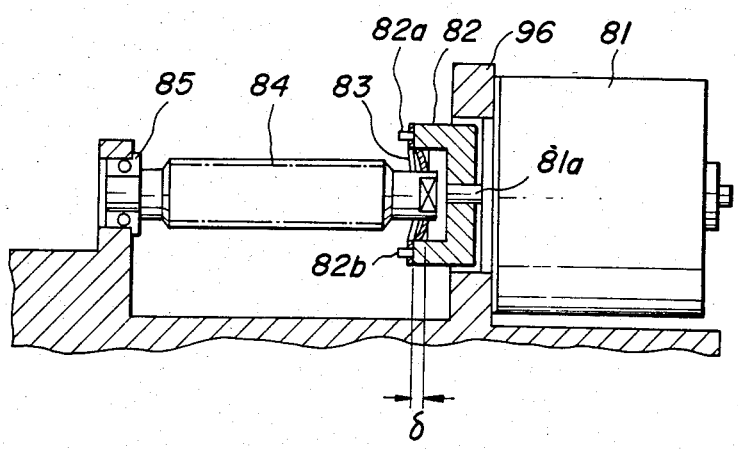
FIG. 16 is a sectional view showing the interconnection between the lead screw and the stepping motor shown in FIG. 15.
Figure 17:
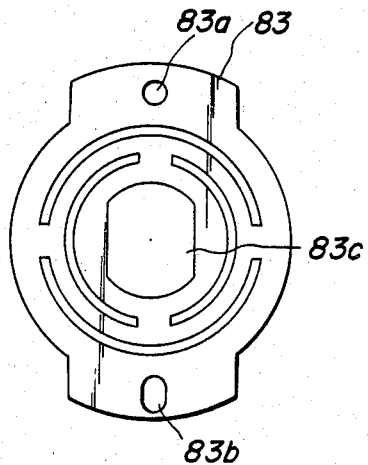
FIG. 17 is a front view showing a gimbal spring used for interconnection between the lead screw and the stepper motor.

As shown in FIG. 2 and in more detail in FIGS. 15 and 16, a stepping motor 81 is mounted to a mounting plate 96 and dowels 82a and 82b of a joint 82, shown in FIGS. 15 and 16, which is securely fixed to the output shaft 81a of the stepping motor 81 are fitted into holes 83a and 83b, respectively, of a gimbal spring 83 shown in FIGS. 15 and 17. One end of the lead screw 84 is connected to the center hole 83c of the gimbal spring 83 and the other end of the lead screw 84 is rotatably supported by a bearing 85, as shown in FIGS. 15 and 16.

The lead screw 84 and the output shaft 81a of the stepping motor 81 are interconnected through the gimbal spring 83 as shown in FIG. 17, so that the lead screw 84 is pushed toward the stepping motor 81 by a displacement 6 as shown in FIG. 16. Therefore, a backlash in the thrust direction of the lead screw 84 with respect to the bearing 85 and the stepping motor 81 can be eliminated.

As shown in FIG. 2, one end of a seek arm 86 is threadably engaged with the lead screw 84 so that a lead bar 87 is shifted forwardly or backwardly through the seek arm 86.

The seek arm 86 is fixed to the outside of a carriage 88. A portion of the carriage 88 which is opposite to the seek arm 86 is guided by a guide bar 89 which is disposed in parallel with the lead screw 84. The pin 75 which supports the block 76 is supported between a pair of projections 88a protruded from the carriage 88.

As shown in FIG. 8, a pair of leaf switches 90 are disposed on the base plate 54a in order to detect whether the cassette is inserted into the magnetic disc unit 15 or not and also to detect the upper or lower surface of the inserted cassette. These switches 90 are disposed to a position which corresponds to the notch 10 for detecting the upper or lower surface of the magnetic disc cassette 1 and to a position which corresponds to a position on the cassette 1 which is symmetrical to the notch 10 with respect to the head window 5.

Figure 18:
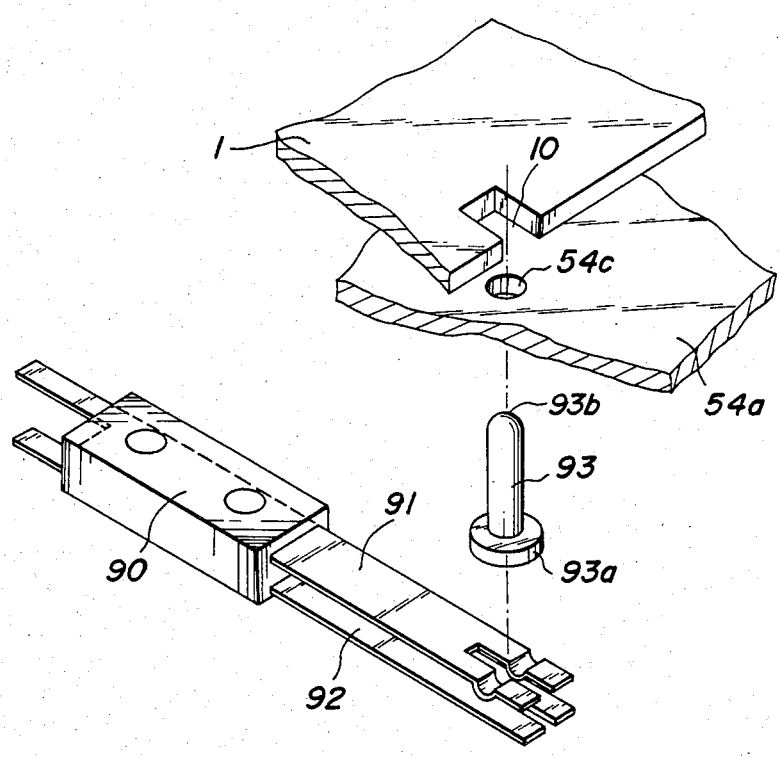
FIG. 18 is a perspective view showing an embodiment of a cassette detection mechanism in a magnetic disc unit in accordance with the present invention.

FIG. 18 is a perspective view showing an embodiment of a detection mechanism. The leaf switch 90 has a movable plate 91 and a stationary plate 92. When no external force is exerted to the movable plate 91, the movable and stationary plates 91 and 92 are maintained substantially in parallel with each other. The base plate 54a has holes 54c. One of the holes 54c is located at the position corresponding to the notch 10 of the magnetic disc cassette 1 when the cassette 1 is inserted into the magnetic disc unit, while the other hole 54c is located at a position which is symmetrical to the notch 10 with respect to the head window 5. A pin 93 is inserted into the hole 54c. The pin 93 has a head 93a which is supported by the movable plate 91 of the leaf switch 90. The head 93a is provided in order to prevent the pin 93 from being slipped off.

FIG. 19A shows the open condition of the leaf switch 90, while FIG. 19B shows the close condition of the leaf switch 90. When the magnetic disc cassette 1 is not inserted into the magnetic disc unit 15, the upper end 93b of the pin 93 is out of engagement with the cassette 1, so that the movable plate 91 is spaced apart from the stationary plate 92.

When the magnetic disc cassette 15 is inserted into the magnetic disc unit 15, the top of the pin 93 which is located at a position which does not correspond to the notch 10 of the magnetic disc cassette 1 is brought into contact with the magnetic disc cassette 1, so that the pin 93 is pushed downward in accordance with the downward movement of the cassette 1. Then, as shown in FIG. 19B, the movable plate 91 is deflected to be brought into contact with the stationary plate 92 when the loading of the magnetic disc cassette 1 is completed. On the other hand, the pin 93 which is located at the position corresponding to the notch 10 of the magnetic disc cassette 1 is out of engagement with the cassette 1, so that the movable plate 91 is not deflected and accordingly is out of engagement with the stationary plate 92.

As described above, whether the magnetic disc cassette 1 is inserted into the magnetic disc unit 15 or not and whether the upper surface of the cassette 1 is directed upward or downward can be detected by a pair of detection means, one of which is located at the position corresponding to the notch 10 of the magnetic disc cassette 1 and the other of which is located at the position which is symmetrical to the notch 10 with respect to the head window 5.

In contrast, a conventional detection means uses a photocoupler as shown in FIG. 20A, in which a light source or light emitting device 95a and a light receiving device or phototransistor 95b are required to be aligned with the notch 10 on both sides of the cassette 1. As a result, the detection means is complicated. Moreover, electrical power must always supplied to the light source 95a, so that power consumption is increased.

FIG. 20B shows another conventional detection means using a microswitch 95c. Here, a pin 95d which is in contact with the microswitch 95c is used to detect whether or not the notch 10 exists and thus it is sufficient that the pin 95d corresponds to the notch 10 only on one side of the cassette 1, so that the structure of the detection means is simple. In addition, no light source is needed, so that only a small amount of power consumption is sufficient.

However, the microswitch 95c has a relatively large height m so that the space for mounting the microswitch 95c is increased. On the other hand, according to the present invention, the leaf switch 90 is used whose height is smaller than that of the microswitch 95c and accordingly the magnetic disc unit in accordance with the present invention can be made thin.

Next, the modes of operation of the magnetic disc unit according to the present invention with the above-describe construction will be described in detail.

Before the magnetic disc cassette 1 is inserted into the magnetic disc unit 15, the lower edge of the upper dust-proof door 19 abuts against the bent portion 20a of the lower dust-proof door 20 under the force of the coiled spring 23, as shown in FIG. 9, so that there exists no space between the upper and lower dust-proof doors 19 and 20.

When the magnetic disc cassette 1 is inserted, the upper and lower dust-proof doors 19 and 20 are forced to swing about their shafts 21 and 22 and move away from each other. Since the upper and lower dust-proof doors 19 and 20 overlap each other, their widths are longer according to this overlap. Therefore, as shown in FIG. 10, the distance $l_3$ between the upper shaft 21 and the upper surface of the magnetic disc cassette 1 inserted into the cassette insertion opening 18a is longer.

This means that the moment arm is long so that the upper and lower dust-proof doors 19 and 20 can smoothly be opened and thus the magnetic disc cassette 1 can easily be inserted.

The magnetic disc cassette 1 thus inserted into the opening 18a is then guided by the cassette guide 24 and the pawl or projection (not shown) engages with the slide lever 7 of the cassette 1. As a consequence, as the cassette 1 advances toward the inside of the magnetic disc unit 15, the shutter 6 is opened gradually.

Then, the magnetic disc cassette 1 engages with the bent portion 25d at the inner end of the cassette discharge lever 25 to move the cassette discharge lever 25 against the force of the coiled spring 28.

The projection 25e of the cassette discharge lever 25 engages with the upwardly extended arm 32 of the locking arm 29, so that the locking arm 29 is rotated in the clockwise direction about the shaft 30 in FIG. 5.

Then, as the locking arm 29 rotates, the hook 33a of the forwardly extended arm 33 of the locking arm 29 is disengaged from the pin 39, so that the eject lever 34 is guided by the pin 35 toward the front panel 18 under the force of the spring 38.

As the eject lever 34 is displaced, the pin 44 is forced to move downwardly along the V-shaped cam slot 45 so that the rotary plate 41 to which the pin 44 is attached is rotated about the shaft 40 in the clockwise direction in FIG. 6A. As a consequence, the cassette guide 24 is lowered together with the cassette 1 as shown in FIG. 6B.

Figure 13:
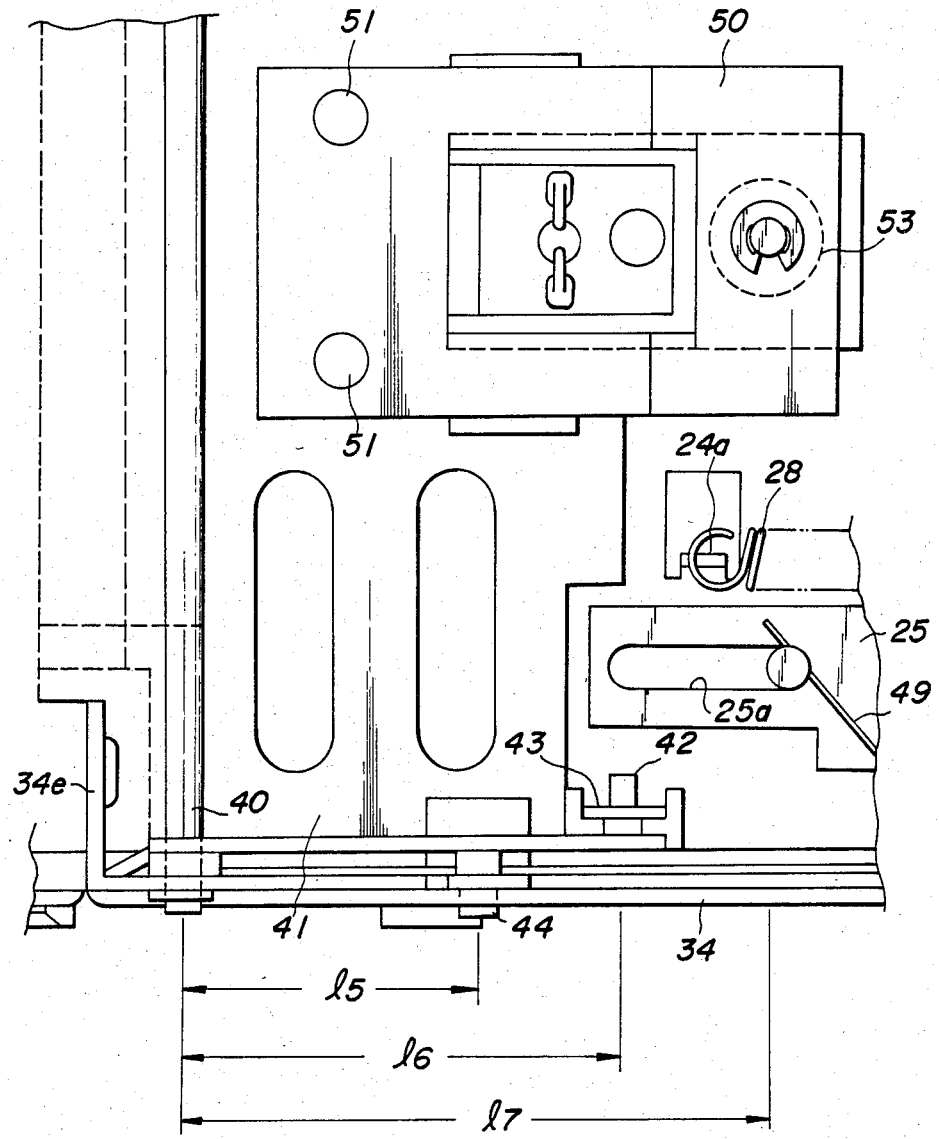
FIG. 13 is a fragmentary top view showing, on enlarged scale, the magnetic disc unit shown in FIG. 2.

In this case, the downward displacement of the cassette guide 24 is amplified in accordance with the ratio between the distance $l_5$ between the shaft 40 and the pin 44 and the distance $l_6$ between the shaft 40 and the pin 42 as shown in FIG. 13.

In FIG. 6A, as the cassette guide 24 is lowered, the leaf spring 50 and the rotary plate 41 are lowered together, so that the hub holder 53 is lowered and consequently the hub 2 of the magnetic disc 12 in the cassette 1 is clamped between the hub holder 53 and the spindle 54 as shown in FIG. 6B. The lower end of the hub holder 53 is fitted into the center hole 3 and the shaft 56 of the spindle 54 is also fitted into the center hole 3 of the hub 2 from the lower side of the hub 2, so that the magnetic disc 12 is centered with respect to the spindle 54. If it happens that the driving hole 4 and the driving pin 58 are aligned with each other, the driving pin 58 is immediately fitted into the driving hole 4 as shown in FIG. 6B. In general, however, the driving pin 58 is in contact with the lower surface of the hub 2, thereby causing elastic deflection of the leaf spring 59. That is, the leaf spring 59 is deflected downwardly.

In this case, the downward displacement of the hub holder 53 with respect to the downward displacement of the rotary plate 41 is amplified by a factor equal to the ratio between the distance $l_5$ and the distance $l_7$ between the shaft 40 and the hub holder 53, as understood from FIG. 13.

When the magnetic disc cassette 1 reaches a loading reference position in this manner, the positioning pin 97 extended from the base plate 54a is fitted into the positioning hole 8 of the cassette 1.

When the cassette discharge lever 25 is advanced from the position shown by a dash-and-dot line to the position shown by a solid line in FIG. 14, the locking lever 46 is rotated in the clockwise direction in FIGS. 2 or 14. Then, the projection 46b of the locking lever 46 is brought into contact with the edge 25f of the cassette discharge lever 25. As a result, the cassette discharge lever 25 is prevented from returning backwardly and thus is locked.

Simultaneously with the downward displacement of the cassette guide 24, the head load arm 66 is also lowered and consequently the head arm 74 is also lowered to such an extent that the head 79 does not contact the magnetic disc 12. That is, the movable head 79 is spaced apart from the magnetic disc 12 by a small distance and the magnetic disc 12 is interposed between the movable and stationary heads 79 and 80.

In this way, the magnetic disc cassette 1 is loaded in the magnetic disc unit 15.

When the magnetic disc cassette 1 is lowered in the manner described above to the surface of the loading position reference, the leaf switches 90 detect that the magnetic disc cassette 1 has been loaded in position, as shown in FIG. 19B. That is, one of the two leaf switches 90 is closed. At the same time, it is detected whether the upper surface of the magnetic disc cassette 1 is directed downwardly or upwardly. Once the loading of the magnetic disc cassette 1 has been confirmed, the motor 61 is energized so that the pulley 60 is rotated via the endless belt 63 and consequently the spindle 54 starts rotating. While the spindle 54 makes one rotation, the driving pin 58 is fitted into the driving hole 4 of the hub 2, as shown in FIG. 6B, so that the magnetic disc 12 starts rotating.

After the loading of the magnetic disc cassette 1 has been detected in response to the output signals from the leaf switches 90, the solenoid 71 is energized to retract the rod 71a and consequently the load arm 70 is pulled toward the solenoid 71, as shown in FIGS. 7 and 8. As a result, as shown in FIG. 7, the push arm 68 is rotated about the pin 67 in the clockwise direction, so that the projection 66a of the head load arm 66 is pushed upwardly against the spring 72. As a consequence, the head load arm 66 is rotated in the clockwise direction about the pin 65 in FIG. 4, so that its inner end 66b is lowered. As a result, the head arm 74 which has been locked by the projection 74a of the head arm 74 is now released to be freely movable downwardly. The force of the coiled spring 78 lowers the magnetic head 79 together with the head arm 74. Therefore, the magnetic head 79 which has been spaced apart from the magnetic disc 12 by a small distance is caused to engage with the magnetic disc 12.

Since the head load arm 66 is pivotally supported at its center by the pin 65 the amount of the displacement of the magnetic head 79 can be made larger than that of the cassette guide 24. Thus, as shown in FIG. 6B, it is ensured that the magnetic head 79 is in contact with the magnetic disc 12.

After the magnetic disc cassette 1 has been loaded in the manner described above, the stepping motor 81 is energized to rotate, so that the lead screw 84 is rotated and consequently the carriage 88 starts to be displaced through the seek arm 86, whereby information is written or read out.

In order to discharge the magnetic disc cassette 1 from the magnetic disc unit 15, the button 98 which is attached to the leading end of the bent portion 34e extended from the eject lever 34 toward the front panel 18, as shown in FIG. 8. Then, as shown in FIG. 5, the eject lever 34 is caused to advance against the force of the coiled spring 38 and then the projection 25e of the cassette discharge lever 25 pushes the arm 32. The eject lever 34 is displaced to the underside of the arm 33 of the locking arm 29 which is rotated in the clockwise direction. As the arm 33 is lowered, the eject lever 34 is again locked by the hook 33a.

As the eject lever 34 advances, the projection 46a of the locking lever 46 is pushed by the eject lever 34, so that the locking lever 46 is rotated about the pin 47 in the counterclockwise direction in FIGS. 2 or 14, so that the projection 46b is disengaged from the edge 25f of the cassette discharge lever 25.

When the eject lever 34 advances, the pin 44 which has been located at the lowermost position of the cam slot 45 is displaced to the uppermost position thereof, as shown in FIG. 5, so that the rotary plate 41 returns to its horizontal position.

When the rotary plate 41 returns to its horizontal position, the cassette guide 24 which is connected via the pin 42 to the rotary plate 41 is also lifted upwardly, so that the magnetic disc cassette 1 returns to the same level as the cassette 1 was positioned at at the time the cassette 1 was inserted into the magnetic disc unit 15 as shown in FIG. 6A.

Under these conditions, the edge 25f of the cassette discharge lever 25 is disengaged from the projection 46b of the locking lever 46 as described before, so that the cassette discharge lever 25 is suddenly attracted toward the front panel 18 under the force of the coiled spring 28. As a result, the bent portion 25d discharges the magnetic disc cassette 1 from the magnetic disc unit 15 through the cassette insertion opening 18a.

Thereafter, all the movable members are reversed in operation, so that the magnetic disc unit 15 is now ready to receive another magnetic disc cassette 1.

After the magnetic disc cassette 1 has been discharged from the magnetic disc unit 15, the upper and lower dust-proof doors 19 and 20 are closed under the force of the coiled spring 23, as shown in FIG. 9. Thus, the cassette insertion opening 18a is completely closed in a dust tight manner.

As described above, according to the present invention, the center hub of the magnetic disc is clamped so that unlike a conventional magnetic disc unit, separate buttons and levers for loading and clamping are not required. Thus, the present invention can provide a magnetic disc unit which is compact in size and light in weight and which can easily clamp the center hub of the magnetic disc.

The upper and lower dust-proof doors are swingably disposed at the cassette insertion opening of a magnetic disc unit and are biased so as to overlap each other. Therefore, when they are closed, no dust is permitted to penetrate into the magnetic disc unit. Thus, the magnetic disc unit is compact in size and light in weight and can be closed in a completely dust tight manner.

The head load arm is associated with the cassette guide, so that the displacement of the movable magnetic head can be amplified. As a result, a magnetic disc unit according to the present invention can be made thin.

While in a conventional magnetic disc unit, photoswitches or microswitches are used to detect the loading of the magnetic disc cassette, according to the present invention, leaf switches are employed so that the magnetic disc unit can be made even thinner.

What is claimed is:

1. A magnetic disc unit having a magnetic head for recording or reproducing information on or from a magnetic disc having a center hub and being accommodated in a cassette, comprising:

a cassette guide member for carrying said cassette in a manner such that said cassette guide member moves said cassette to a predetermined position in the insertion direction of said cassette in accordance with the insertion of said cassette and for guiding said cassette to a recording/reproducing position at which information is recorded or reproduced on or from said magnetic disc;

a spindle for rotating said magnetic disc;

a hub holding member for pushing said center hub of said magnetic disc to said spindle to hold said magnetic disc between said spindle and said hub holding member;

a transmitting member having a first portion for moving said cassette guide member to said recording/reproducing position, and a second portion for moving said hub holding member to said spindle, the displacement of said second portion being larger than that of said first portion; and a driving member for driving said transmitting member such to move said transmitting member in a manner that said cassette guide member is positioned to said recording/reproducing position, when said cassette guide member reaches said predetermined position.

2. A magnetic disc unit as claimed in claim 1, wherein said transmitting member is a rotary plate having an end pivotally supported for rotation by said driving member, the distance between said second portion and said end being longer than the distance between said first portion and said end, whereby the movement of said second portion is amplified in accordance with the ratio between said distances.

3. A magnetic disc unit as claimed in claim 2, wherein said driving member has an eject lever coupled to said rotary plate via a coupling member, a spring member coupled to said eject lever for moving said eject lever in the direction of the ejection when said cassette guide member reaches said predetermined position and a button coupled to said eject lever for controlling the discharge of said cassette, said eject lever being moved in the direction of the ejection of said cassette by said spring member when said cassette guide member reaches said predetermined position, and said coupling member swings said rotary plate toward said recording-/reproducing position and away from said recording-/reproducing position according to whether said eject lever moves in the direction of the insertion of said cassette or in the direction of the insertion of said cassette in response to the operation of said button.

4. A magnetic disc unit as claimed in claim 3, further comprising a cassette discharge lever for discharging said cassette, said cassette discharge lever moving in the insertion direction of said cassette in accordance with the insertion of said cassette and being kept in a lock condition in which said cassette discharge lever does not discharge said cassette when said cassette reaches said predetermined position, said lock condition being released by said eject lever to discharge said cassette when said eject lever is moved in the insertion direction of said cassette in response to the operation of said button.

5. A magnetic disc unit as claimed in claim 1, wherein said spindle has a spindle shaft which is movable in a direction perpendicular to the main surface of said cassette, said spindle shaft being biased toward such a direction as to clamp said center hub between said hub holding member and said spindle shaft.

6. A magnetic disc unit as claimed in claim 1, wherein said magnetic disc unit further comprises a head seeking mechanism including a stepping motor, a lead screw and a gimbal spring for connecting said stepping motor to said lead screw in such a way that said magnetic head is moved toward a position on said magnetic disc at which said information is recorded or reproduced.

7. A magnetic disc unit as claimed in claim 1, which further comprises
an opening for allowing the insertion of said cassette; and
a pair of dust-proof doors, each pivotally supported inside of said opening in a manner that said dust-proof doors are so biased that an end of one of said dust-proof doors which is not pivotally supported is in contact with the side of the other dust-proof door to close said opening when said cassette is not inserted.

8. A magnetic disc unit as claimed in claim 1, wherein said cassette has a notch located at one end thereof and extending from the side of one main surface of said cassette to the side of another main surface of said cassette for detecting the insertion of said cassette and whether said one main surface of said cassette is facing up or down, comprising:
a pair of leaf switches disposed at positions corresponding to said notch when said cassette is inserted with said one main surface facing up and down respectively;
a first means for detecting the insertion of said cassette in response to the combination of the operations of said pair of leaf switches when said cassette held in said cassette guide member reaches said recording/reproducing position; and
a second means for detecting that said one main surface is positioned facing up in response to the combination of the operation of said pair of leaf switches when said cassette held in said cassette guide member reaches said recording/reproducing position.

9. A magnetic disc unit as claimed in claim 1, wherein said
magnetic head contacts said magnetic disc to record or reproduce information on or from said magnetic disc when said cassette is positioned at said recording/reproducing position; and which further comprises
a first arm member having a first end and a second end which are pivotal at a fulcrum formed on said cassette guide member;
a stopper member for stopping said first end of said first arm member at a stopping position; and
a second arm member for supporting said magnetic head and for moving said magnetic head toward said magnetic disc in a manner that said magnetic head contacts said magnetic disc in accordance with the movement of said second end of said first arm member when said cassette guide member reaches said recording/reproducing position.

10. A magnetic disc unit as claimed in claim 9, wherein said fulcrum is located at a position between said first end and said second end of said first arm member, said first arm member is swingable around said first end and stoppable by said stopper member in accordance with a movement of said fulcrum, and said second end is movable toward said magnetic head when said cassette guide member reaches said recording/reproducing position, and when said magnetic disc is recording or reproducing information, said stopper member releases said first end of said first arm member from said stopping position to rotate said first arm member around said fulcrum and move said second end of said first arm member toward said magnetic disc at the time of recording/reproducing information on/from said magnetic disc, whereby the displacement of said second end of said first arm member is larger than that of said fulcrum.

* * * * *